(12) United States Patent
Maier (10) Patent No.: US 11,209,789 B2
(45) Date of Patent: Dec. 28, 2021

(54) SAFETY SWITCHING DEVICE AND SAFETY-RELATED DEVICE (71) Applicant: SIEMENS AKTIENGESELLSCHAFT, Munich (DE)

(72) Inventor: Mario Maier, Ensdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 766 days.

(21) Appl. No.: 15/998,897

(22) PCT Filed: Feb. 16, 2016

(86) PCT No.: PCT/EP2016/053274
§ 371 (c)(1),
(2) Date: Aug. 16, 2018

(87) PCT Pub. No.: WO2017/140350
PCT Pub. Date: Aug. 24, 2017

(65) Prior Publication Data
US 2021/0208560 A1 Jul. 8, 2021

(51) Int. Cl.
H01H 47/00 (2006.01)
G05B 19/042 (2006.01)
(52) U.S. Cl.
CPC ....... *G05B 19/0428* (2013.01); *H01H 47/005* (2013.01); *G05B 19/0423* (2013.01);
(Continued)
(58) Field of Classification Search
CPC ........... G05B 2219/39172; G05B 2219/50391; G05B 2219/2642; G05B 2219/21152;
(Continued)

(56) References Cited

U.S. PATENT DOCUMENTS

2006/0077613 A1 4/2006 Hornung
2009/0073628 A1* 3/2009 Nitsche ............... H01H 47/005
361/190

(Continued)

FOREIGN PATENT DOCUMENTS

CN 100536056 C 9/2009
CN 103155349 A 6/2013
(Continued)

OTHER PUBLICATIONS

Chinese Office Action for corresponding Chinese Patent Application No. 201600818794, dated Jun. 28, 2020.
(Continued)

*Primary Examiner* — Bryan R Perez
(74) *Attorney, Agent, or Firm* — Lempia Summerfield Katz LLC (57) ABSTRACT The invention relates to a safety switching device (10) comprising a control side (40) with at least one single-error tolerance, having a first and second control unit (12, 14), each formed on an actuation side (50) for emitting a switch command (20) to at least two switching elements (52, 54, 56), and comprising a monitoring unit (30, 30.1, 30.2, 30.3) having a first and a second connection element (31, 36), and which monitoring unit (30, 30.1, 30.2, 30.3) is designed to emit the switch command (20) to at least one switching element (52, 54, 56) of a load circuit (23), characterised in that the at least two switching elements (52, 54, 56) are each designed as standard components that are free from a forced guidance of the contacts (62) thereof, and the first connection element (31) is directly connected to the second control unit (14) via a first feedback channel (42) and the second connection element (36) is directly connected to the first control unit (12) via a second feedback channel (44).

14 Claims, 5 Drawing Sheets (52) U.S. Cl.
CPC ............... *G05B 2219/21152* (2013.01); *G05B 2219/24024* (2013.01)

(58) Field of Classification Search
CPC ........... G05B 2219/21168; G05B 2219/24024; G05B 2219/24182; G05B 2219/2614; G05B 2219/2639; G05B 19/042; G05B 19/0423; G05B 19/0428; H01H 2009/543; H01H 2009/546; H01H 2300/014; H01H 2300/03; H01H 33/593; H01H 71/04; H01H 71/128; H01H 71/24; H01H 9/0271; H01H 9/54; H01H 9/542; H01H 9/548; H01H 9/56; H01H 9/563; H01H 47/005
See application file for complete search history.

(56) References Cited

U.S. PATENT DOCUMENTS

| | | |
|---|---|---|
| 2012/0043823 A1 | 2/2012 | Stratakos |
| 2013/0233044 A1 | 9/2013 | Arth et al. |
| 2015/0015089 A1* | 1/2015 | Le ...................... H01H 9/0271 307/125 |
| 2015/0349632 A1 | 12/2015 | Frank |

FOREIGN PATENT DOCUMENTS

| | | |
|---|---|---|
| CN | 105281733 A | 1/2016 |
| DE | 4319750 A1 | 12/1994 |
| DE | 102010060323 A1 | 5/2012 |
| EP | 1861860 A1 | 12/2007 |
| EP | 2383762 B1 | 9/2013 |
| EP | 2856184 A1 | 4/2015 |

OTHER PUBLICATIONS

"Emergency Stop Relays, Safety Gate Monitors." Pilz GmbH & Co. p. 1-3. XP000961973; Jul. 2000.

PCT International Search Report and Written Opinion of International Searching Authority dated Oct. 18, 2016 corresponding to PCT International Application No. PCT/EP2016/053274 filed Feb. 16, 2016.

* cited by examiner

SAFETY SWITCHING DEVICE AND SAFETY-RELATED DEVICE

This application is the National Stage of International Application No. PCT/EP20161053274, filed Feb. 16, 2016, which is hereby incorporated herein by reference.

BACKGROUND

The present embodiments relate to a safety switching device and a safety-related device equipped with such a safety switching device.

DE 43 19 750 A1 discloses a device for the functional supervision of switching outputs having two microprocessors. The control units are embodied to actuate standard relays that are combined to form a bridge circuit. Two strands each with two standard relays are arranged in parallel in the device. The two strands are connected to the terminals of a switching output and thus facilitate safe switching. The two strands of standard relays are further connected to an inductive transmission which are connected to the microprocessors for supervising the switching status of the standard relay.

DE 10 2010 060 323 A1 discloses a switching arrangement for the actuation of two relays by means of a microcontroller, which is monitored by a watchdog. The switching arrangement has four electric switches, which for each relay are connected in pairs to the microcontroller and the watchdog. Herein, the relays are embodied without forcibly guided contacts. The watchdog is embodied to monitor the microcontroller and in the event of a malfunction of the microcontroller to interrupt the power supply to the relays via a separate electric switch.

EP 2 383 762 B1 discloses a safety switching device comprising two microcontrollers. Each of the microcontrollers is coupled to a driver stage via which a relay can be actuated. To monitor the switching status of the relays, the driver stages are connected to both microcontrollers.

US 2013/233044 discloses a sensor arrangement for detecting a safe installation state of an installation operated in an automated manner.

SUMMARY AND DESCRIPTION

The scope of the present invention is defined solely by the appended claims and is not affected to any degree by the statements within this summary.

Many automation applications require a switching device that provides a high degree of safety, is space-saving, and may be produced with a minimum number of the simplest possible components. In the prior art, the higher the safety level reached, the more complex and costly the switching devices. The present embodiments may obviate one or more of the drawbacks or limitations in the related art. For example, a switching device that provides the highest possible level of safety simultaneously with minimum construction costs, a reduced number of components, and minimum space requirements is provided.

The safety switching device according to one or more of the present embodiments includes on its control side at least one single-failure tolerance, i.e. a hardware failure tolerance of at least one. This ensures that the safety switching device maintains safe functionality even in the event of the failure of one of its components. The safety switching device comprises a first and a second control unit, which are each embodied to emit a switch command, which is, for example, transmitted via a communication line, in order to convert this into an actuation. The safety switching device also includes at least one monitoring unit in each case provided with a first and a second connection element. In addition, in the monitoring unit, the connection elements are directly connected to the control units via feedback channels. Thus, the monitoring unit is used to monitor the activity of the control units and the control units are used to monitor the monitoring unit. The control units and the monitoring unit belong to the control side of the safety switching device according to one or more of the present embodiments. According to the present embodiments, the first connection element is connected to the second control unit via a first feedback channel. The second connection element is in turn connected to the first control unit via a second feedback channel. This results in differentiated monitoring of the components used on the control side, thus achieving a high degree of operational safety.

The control side is supplemented by the actuation side on which at least two switching elements are arranged. The switching elements are connected to a load circuit, which belongs to an application, for example a power supply of an electric motor, and is embodied to interrupt the load circuit. The switch commands emitted by the control units are supplied via the monitoring unit to at least one of the at least two switching elements and converted into a switching operation in the load circuit. According to the present embodiments, the switching elements are embodied as standard components. Standard components are designs of electromechanical components with which no forced guidance is provided for the contacts with which the load circuit can be interrupted. In a standard component, such as for example a standard relay, without forcibly guided contacts, on the occurrence of a failure, for example contact sticking, a state can occur in which a normally closed contact and a normally open contact can be simultaneously closed.

Standard components, i.e. components without forcibly guided contacts, are less complex and take up less space than switching elements with forcibly guided contacts. Moreover, standard components are less expensive and separately provide less safety than switching elements with forcibly guided contacts. Moreover, the monitoring unit in the safety switching device according to one or more of the present embodiments only requires two control units and two connection elements. Compared to known solutions, this achieves a significant saving on electronic components. The saving on space means the safety switching device according to the present embodiments can be produced much more economically and more compactly and can, for example, be installed in a single housing with smaller dimensions than solutions known to date. Furthermore, standard components are less expensive than components with force-guided contacts thus enabling cost-efficient maintenance of the claimed safety switching device. At the same time, compared to known solutions, the safety switching device according to one or more of the present embodiments provides an at least constant safety level.

In the safety switching device according to one or more of the present embodiments, the first control unit is directly connected to a base terminal of the first connection element for the actuation thereof. Hence, the actuation of the first connection element by the first control unit is monitored by the second control unit means of the first feedback channel. Herein, the second control unit is embodied to initiate a countermeasure in the event of the second control unit identifying a failure. A countermeasure is, for example, an actuation of the base terminal of the second connection element in order to establish a safe state on the actuation side.

Alternatively or supplementarily, the second control unit can be directly connected to a base terminal of the second connection element for the actuation thereof. Hence, the actuation of the second connection element by the second control unit is monitored by the first control unit by means of the second feedback channel. Herein, the first control unit is embodied to initiate a countermeasure in the event of the first control unit identifying a failure. A countermeasure is, for example, an actuation of the base terminal of the first connection element in order to establish a safe state on the actuation side. Overall, this ensures additional monitoring of the components on the control side. This additional monitoring ensures that the control side achieves a diagnostic coverage of more than 90%, in particular of 90% to 99%. The diagnostic coverage is the ratio of two values over a reference period. The first value is the number of recognized dangerous failures that occurred in the reference period. The second value is the sum of the first value and the number of non-recognized dangerous failures in the reference period. The diagnostic coverage is the quotient of the first and second value and can be shown as a percentage value.

Consequently, the safety switching device according to one or more of the present embodiments may achieve an operational safety class of SIL 3. Thus, the additional monitoring described is obtained with components that are present anyway, thus minimizing the complexity of the safety switching device and the construction costs.

In one embodiment, the actuation side of the safety switching device comprises at least one two-failure tolerance, i.e. a hardware failure tolerance of at least two and/or has a safe failure fraction, SFF for short, of at least 60%, preferably 70% to 90%. To this end, the actuation side is provided with at least three switching elements so that, in the event of a failure of two switching elements at least one third element is available to interrupt the load circuit. Furthermore, the switching elements are embodied such that the combination of the individual degrees of diagnostic coverage thereof is at least 60%, preferably 70% to 90%. This still enables a high degree of safety to be achieved with simple and place-saving switching elements, for example standard relays. Hence, the actuation side is suitable for applications requiring classification as SIL 3 or SIL 4, i.e. including for particularly safety-critical applications. Overall, the safety switching device according to one or more of the present embodiments is suitable for achieving at least one classification as a SIL 3 device in a simple, compact and cost-effective design.

Further preferably, the first and/or second connection element each comprise a collector terminal and an emitter terminal. Hence, in conjunction with the base terminal, the first or second connection element functions as a logic element. When operating voltage is applied to the collector terminal of the first or second connection element, the actuation of the base terminal triggered by the switch command serves to enable or stop current flow through the associated emitter. The commonly used terms in the field of transistors, 'collector', 'base' and 'emitter' should be understood as exemplary only. All electronic components with the same technical functions form connection elements within the present embodiments. Such connection elements are quick and easy to process, offer a high degree of reliability and a high actuation speed. This enables countermeasures, for example separation of the load circuit by the switching elements, to be initiated rapidly.

In addition, in the safety switching device according to one or more of the present embodiments, the first emitter terminal, which belongs to the first connection unit, can be directly connected to the second collector terminal, which in turn belongs to the second connection unit. Alternatively, the first collector terminal on the first connection unit can be directly connected to the second emitter terminal of the second connection unit. During the operation of the monitoring unit, such direct connection of the connection elements via their collector and emitter terminals ensures fault-robust mutual recognition of failure states when the switch command is sent to the switching elements.

The first and/or second connection element is advantageously in each case embodied as a transistor, field-effect transistor, thyristor, TRIAC, an insulated gate bipolar transistor (IGBT), driver module, integrated circuit or as an AND module. These components provide a high degree of reliability, actuation speed and minimum power losses with high efficiency for a wide range of operating parameters, for example current intensity, voltage, temperature load, etc. The substantially identical functional principle enables the safety switching device according to one or more of the present embodiments to be adapted to a wide range of applications by a corresponding choice of connection elements. In particular, the claimed safety switching device permits simple scaling at currents and voltages of different intensities.

In the safety switching device according to one or more of the present embodiments, the monitoring unit together with the first and/or second control unit can also be embodied as a coherent application specific integrated circuit (ASIC). An ASIC provides a high degree of integration and ensures a particularly high saving on space. The ASIC preferably has a communication interface that facilitates communication with a higher-ranking control instance, for example a programmable logic control, PLC for short. Furthermore, the functionality of ASICs can be automatically completely checked during production. This enables the number of operational steps and hence potential failure sources to be reduced duringg the production of the safety switching device according to one or more of the present embodiments. Consequently, the claimed safety switching device can be produced with a minimum scrap rate.

In a further embodiment, the safety switching device comprises at least two monitoring units. The monitoring units are each connected to the first and second control unit and each embodied to emit a switch command to at least one assigned switching element. The first monitoring unit is coupled to a first actuator (e.g., first actuating means) and the second monitoring unit is coupled to a second actuator (e.g., second actuating means). This facilitates separate, and hence independent, actuation of the first and second actuating means. In particular, the safety switching device is embodied for adjustable time-staggered actuation of the switching elements. Herein, the monitoring units are preferably embodied identically, i.e. with two connection elements of which the base terminals are each actuated by the first and second control unit. In each of the monitoring units, the emitter terminal of the first connection element is directly connected to the second control unit via a first feedback channel. Similarly, in each of the monitoring units, the emitter terminal of the second connection element is directly connected to the first control unit via a second feedback channel. The adjustable time-staggered actuation enables targeted contact erosion to be set in the switching elements. The contact erosion that occurs can be concentrated in one single switching element or optionally distributed between a plurality of switching elements. As a result of the spatial compactness of the solution according to the present embodiments, a plurality of monitoring units, which are accommodated together with the control units in a common housing, can provide a highly parallelized safety switching device with a high degree of redundancy and hence reliability. The cost-efficient design of the monitoring units further increases the economic efficiency of the solution according to the present embodiments.

Alternatively, the at least two switching elements can also be connected to the monitoring unit via a common signal line. Herein, a switch command from the control units is forwarded as a single signal for the actuation of the switching elements. A common signal line enables the wiring outlay to be minimized even with a high number of switching elements. Furthermore, even in the case of numerous switching elements, only two transition points are required between the control side and the actuation side. Particularly preferably, the safety switching device according to one or more of the present embodiments has a modular design. Herein, the control side components are each accommodated as a module in a first housing and the actuation side components in a second housing. Herein, the number of transition points between the control side and the actuation side define the number of electrical connections, for example in the form of pins, necessary for operation as intended. A low number of required electrical connections between the control side and the actuation side reduces the complexity of the module coupling and hence increases the robustness thereof. The safety switching device according to one or more of the present embodiments is flexible due to the choice of module with suitable electrical dimensions and at the same time provides a significant level of robustness.

Particularly preferably, the at least two switching elements are in each case embodied as a relay, auxiliary contactor, main contactor or as a magnet valve. Switching elements of this kind cover a wide range of current intensities and voltages in the load circuit so that the safety switching device according to one or more of the present embodiments is substantially equally suitable for all forms of load circuits. To this end, the control side of the safety switching device according to one or more of the present embodiments has a suitable universal design.

Moreover, in the safety switching device according to one or more of the present embodiments, the at least two switching elements can be embodied diversely, i.e. be of different types. A diverse actuation side has a reduced beta factor. This represents the tendency for a frequent occurrence of failures in identical components. Failures of this kind are also called common cause failures. Consequently, the safety switching device according to one or more of the present embodiments is embodied also to withstand disruptive influences that inevitably result in the destruction of individual components. The diversity can, for example, consist in different degrees of protection against overload currents, for example as a result of short circuits. This further increases the achievable safety.

Further preferably, the first and second control unit in the safety switching device according to one or more of the present embodiments may be directly connected to one another for mutual diagnosis. The diagnostic connection between the control units is embodied to transport a signal characteristic of the state of the emitting control unit. The diagnostic line is also embodied to transport a command from one control unit to the other, in particular a cut-out command. Hence, the possible consequences of a function failure of one of the two control units can be counteracted before any more serious damage occurs. The control unit executing the cut-out is also embodied, following a cut-out command, to notify the other control unit of this non-intended state in the form of an error message to a user or a higher-ranking controller unit. This provides further monitoring within the safety switching device according to one or more of the present embodiments with the same number of components thus increasing the achievable operational safety.

As another example, the safety-related device according to one or more of the present embodiments is provided. The safety-related device is embodied, for example, as a safety switching device, as a safe coupling relay, as a safe relay module, as a safe PLC relay output, or as a safety module in a PLC. Herein, the safety-related device is provided with an above-described safety switching device that provides the required safety functions. As a result of the compact safety switching device, the safety-related device has small dimensions. Alternatively, it is possible for only the control side of the safety switching device according to one or more of the present embodiments to be accommodated in the housing of the safety-related device. Herein, terminals are provided on the housing of the safety-related device to permit coupling to a separate module in which the actuation side of the safety switching device is accommodated. The safety-related device according to one or more of the present embodiments may be embodied as a SIL 2-, SIL 3- or SIL 4-device.

DETAILED DESCRIPTION

Figure 1:
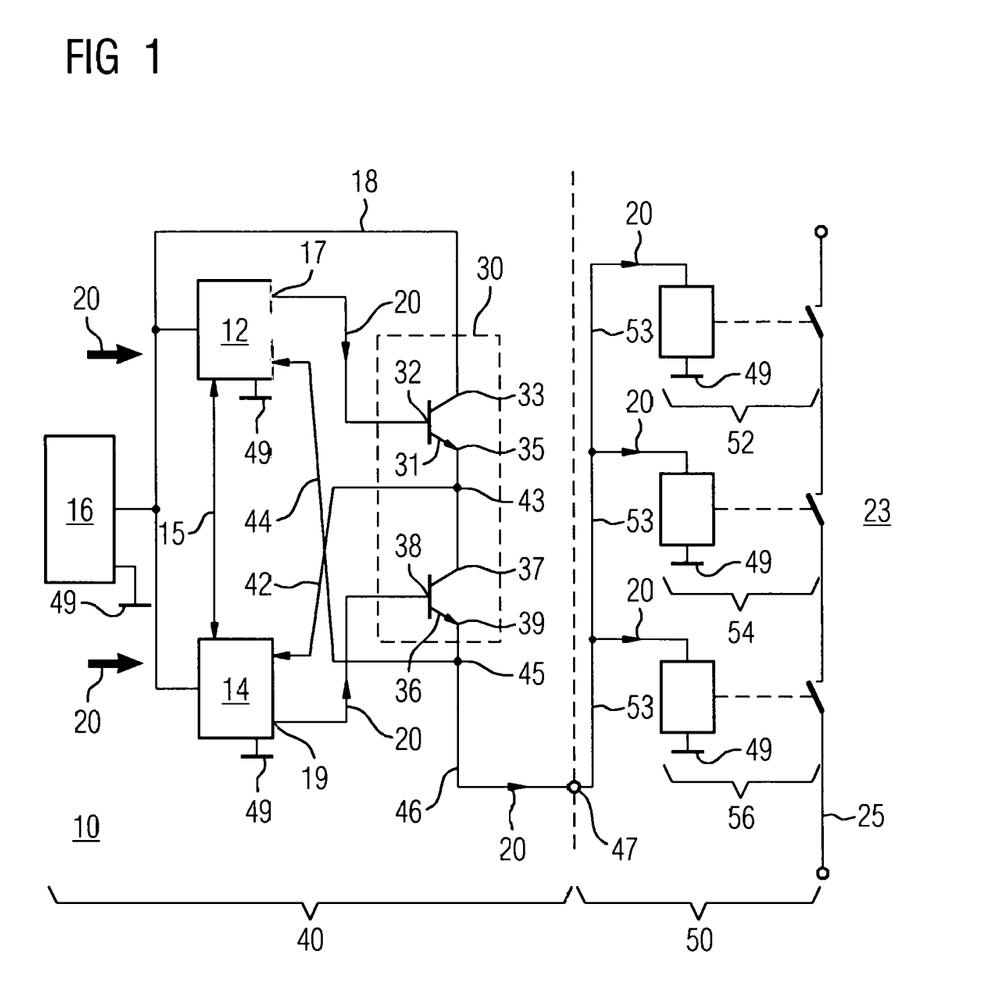
FIG. 1 schematically shows the structure of a first exemplary embodiment of the safety switching device.

FIG. 1 depicts a first exemplary embodiment of the safety switching device 10, which is substantially divided into a control side 40 and an actuation side 50. A voltage supply 16 used for the power supply to the components on the control side 40 is arranged on the control side 40. The voltage supply 16 provides an operating voltage 18 for a first and second control unit 12, 14 and a monitoring unit 30. The control units 12, 14 and the power supply unit 16 are each connected to a frame terminal 49. A control line, not shown in further detail, is used to emit switch commands 20 to the first and a second control unit 12, 14, which convert them into a switching operation on the actuation side 50. The switch commands 20 reach the control units 12, 14 via their signal inputs, not shown in further detail. The monitoring unit 30 comprises a first and a second connection element 31, 36, which are embodied as transistors and connected in series. The operating voltage 18 is applied to a first collector terminal 33. A first base terminal 32 of the first connection unit 31 is connected to an output 17 of the first control unit 12. The switch command 20 is emitted by the first control unit 12 as an actuation of the first base terminal 32 in the first connection element 31. In the case of a corresponding actuation at the first base terminal 32, the first connection element 31 permits current flow through a first emitter terminal 35. Furthermore, the second collector terminal 37 of the second connection element 36 lies within the region of the first emitter terminal 35 and in-between there is a first branch 43 from which a first feedback channel 42 branches. The first feedback channel 42 in turn leads to the second control unit 14. The switching state of the first connection element 31 is reported to the second control unit 14 via the first feedback channel 42. The second control unit 14 is embodied to compare the input of the feedback channel with the switch command 20 present at the second control unit 14 and hence to verify an intended switching state at the first connection element 31 or to identify a faulty switching state.

Similarly to the first control unit 12, the switch command 20 is emitted by the second control unit 14 via its output 19 to the second base terminal 38 of the second connection element 36. The corresponding actuation of the second base terminal 38 causes the second connection element 36 to permit current flow via a second emitter terminal 39. The current flow from the second emitter terminal 39 to the coupling point 47 takes place via a signal output 46. A present current flow in the signal output 46 depicts the present switch command 20 to the actuation side 50. A second branch 45 from which a second feedback channel 44 leads to the first control unit 12 is arranged between the coupling point 47 and the second emitter terminal 39. The signal guided via the second feedback channel 44 to the first control unit 12 represents the switching state of the second connection element 36. The first control unit 12 is embodied to compare the signal transported via the second feedback channel 44 with the present switch command 20. This enables the first control unit 12 to verify an intended switching state at the second connection element 36 or to identify a faulty switching state.

If the first control unit 12 recognizes a faulty switching state at the second connection element 36, the first control unit 12 is embodied, by means of a corresponding actuation at the first base terminal 32 of the first connection unit 31, to prevent current flow to the first emitter terminal 35. This prevents further operation based on a faulty switch command 20 or hardware defect in the safety switching device 10. The second control unit 14 is similarly embodied, on recognition of a faulty switching state at the first connection element 31, by actuation of the second base terminal 38, to prevent current flow to the second emitter terminal 39.

Hence, in the safety switching device according to one or more of the present embodiments, at least one single-failure tolerance, also called hardware failure tolerance of one, is implemented on the control side 40. The connection elements 31, 36 of the monitoring unit establish indirect crossover monitoring between the control units 12, 14. Furthermore, the first and second control unit 12, 14 are directly connected to one another via a diagnostic line 15. The diagnostic line also comprises an actuation line that facilitates mutual cut-off of the control units. This implements direct mutual monitoring so that combination with indirect crossover monitoring achieves a particularly high degree of safety on the control side 40. In particular, in the case of the presence of one hardware failure, diagnostic coverage of 90% to 99% is achieved on the control side 40.

The connection between the control side 40 and the actuation side 50 takes place via the coupling point 47. A first, a second and a third switching element 52, 54, 56 embodied as standard relays are arranged on the actuation side 50. The switching elements 52, 54, 56 are each embodied to interrupt a line 25 of a load circuit 23, not shown in further detail. The switching elements 52, 54, 56 are connected to a common signal line 53 via which the switch command 20 is emitted to the switching elements 52, 54, 56 in the case of corresponding actuation and functionality of the components on the control side 40. The switching elements 52, 54, 56 are each connected to a frame terminal 49 via which the switch command 20 is derived. As a result, a pp circuit is implemented in each of the switching elements 52, 54, 56. The series connection of the switching elements 52, 54, 56 ensures safe separation of the line 25 of the load circuit 23 even in the case of two hardware failures on the actuation side 50. Overall, the actuation side 50 has at least one two-failure tolerance, also called hardware failure tolerance of two. At least two of the switching elements 52, 54, 56 are diverse. i.e. have different designs, so that the failure tolerance of the actuation side 50 is further increased. When two hardware failures are present, the actuation side 50 achieves a safe failure fraction of at least 60%, in particular 70% to 90%.

Figure 2:
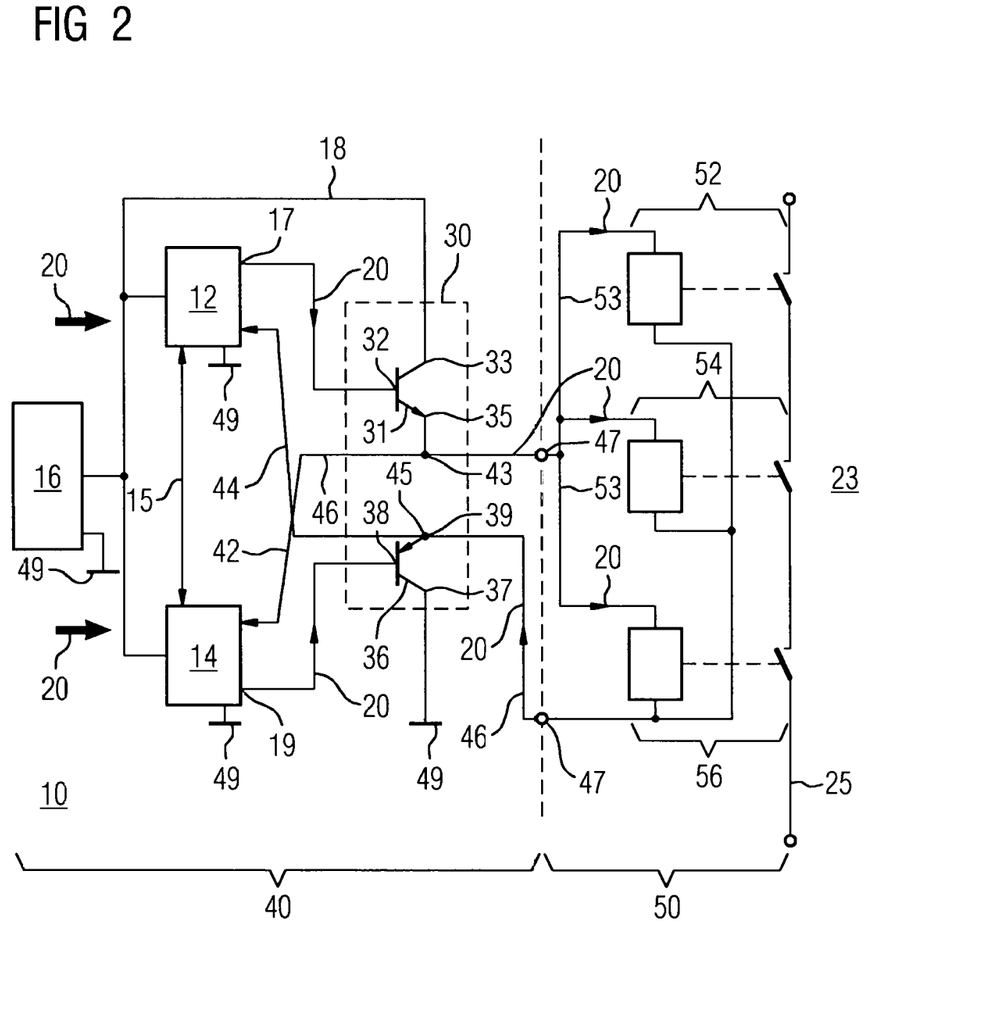
FIG. 2 schematically shows the structure of a second exemplary embodiment of the safety switching device.

FIG. 2 depicts a second exemplary embodiment of the safety switching device 10 according to one or more of the present embodiments, which is substantially divided into a control side 40 and an actuation side 50. A voltage supply 16 used for the power supply to the components on the control side 40 is arranged on the control side 40. The voltage supply 16 provides an operating voltage 18 for a first and second control unit 12, 14 and a monitoring unit 30. The control units 12, 14 and the power supply unit 16 are each connected to a frame terminal 49. A control line, not shown in further detail, is used to emit switch commands 20 to the first and a second control unit 12, 14, which converts them into a switching operation on the actuation side 50. The switch commands 20 reach the control units 12, 14 via signal inputs, not shown in further detail. The monitoring unit 30 comprises a first and a second connection element 31, 36, which are embodied as transistors. The operating voltage 18 is applied to a first collector terminal 33. A first base terminal 32 of the first connection unit 31 is connected to an output 17 of the first control unit 12. The switch command 20 is emitted by the first control unit 12 as an actuation of the first base terminal 32 in the first connection element 31. In the case of a corresponding actuation at the first base terminal 32, the first connection element 31 permits current flow through a first emitter terminal 35. Furthermore, in the region of the first emitter terminal 35, there is a first branch 43 that leads to a coupling point 47 to the actuation side and from which a first feedback channel 42 branches. The first feedback channel 42 in turn leads to the second control unit 14. The switching state of the first connection element 31 is reported to the second control unit 14 via the first feedback channel 42. The second control unit 14 is embodied to compare the signal of the feedback channel 42 with the switch command 20 present at the second control unit 14 and hence to verify an intended switching state at the first connection element 31 or to identify a faulty switching state.

The switch command 20 is returned via the actuation side 40 via a further coupling point 47 to a second branch 45. The second branch 45 leads to a second emitter terminal 39 of the second connection unit 36.

Similarly to the first control unit 12, the switch command 20 is emitted by the second control unit 14 via its output 19 to the second base terminal 38 of the second connection element 36. The corresponding actuation of the second base terminal 38 causes the second connection element 36 to permit current flow between the second emitter terminal 39 and the second collector terminal 37 connected to a frame terminal 49. The current flow from the coupling point 47 to the second branch 45 via the second emitter terminal 39 takes place via a signal output 46. A present current flow in the signal output 46 depicts the present switch command 20 to the actuation side 50. The second branch 45 from which a second feedback channel 44 leads to the first control unit 12 is arranged between the coupling point 47 and the second emitter terminal 39. The signal guided via the second feedback channel 44 to the first control unit 12 represents the switching state of the second connection element 36. The first control unit 12 is embodied to compare the signal transported via the second feedback channel 44 with the present switch command 20. This enables the first control unit 12 to verify an intended switching state at the second connection element 36 or to identify a faulty switching state.

If the first control unit 12 recognizes a faulty switching state at the second connection element 36, the first control unit 12 is embodied, by means of a corresponding actuation at the first base terminal 32 of the first connection unit 31, to prevent current flow to the first emitter terminal 35. This prevents further operation based on a faulty switch command 20 or hardware defect in the safety switching device 10. The second control unit 14 is similarly embodied, on recognition of a faulty switching state at the first connection element 31, by actuation of the second base terminal 38, to prevent current flow to the second emitter terminal 39.

Thus, in the safety switching device according to one or more of the present embodiments, at least one single-failure tolerance, also called hardware failure tolerance of one, is implemented on the control side 40. The connection elements 31, 36 of the monitoring unit establish indirect crossover monitoring between the control units 12, 14. Furthermore, the first and second control unit 12, 14 are directly connected to one another via a diagnostic line 15. The diagnostic line also comprises an actuation line that facilitates mutual cut-off of the control units. This implements direct mutual monitoring so that combination with indirect crossover monitoring achieves a particularly high degree of safety on the control side 40. In particular, in the case of the presence of one hardware failure, a diagnostic coverage of 90% to 99% is achieved on the control side 40.

The connection between the control side 40 and the actuation side 50 takes place via the coupling points 47. The connection between the control side 40 and the actuation side 50 via two coupling points 47 implements a pm circuit on each of the switching elements 52, 54, 56. A first. a second and a third switching element 52, 54, 56 embodied as standard relays are arranged on the actuation side 50. The switching elements 52, 54, 56 are each embodied to interrupt to a line 25 of a load circuit 23, not shown in further detail. The switching elements 52, 54, 56 are connected to a common signal line 53 via which the switch command. 20 is emitted to the switching elements 52, 54, 56 in the case of corresponding actuation and functionality of the components on the control side 40. The parallel connection of the switching elements 52, 54, 56 ensures safe separation of the line 25 of the load circuit 23 even when two hardware failures are present on the actuation side 50. Overall, the actuation side 50 has at least one two-failure tolerance, also called hardware failure tolerance of two. At least two of the switching elements 52, 54, 56 are diverse, i.e. have different designs, so that the failure tolerance of the actuation side 50 is further increased. When two hardware failures are present, the actuation side 50 achieves a safe failure fraction SFF of at least 60%, in particular 70% to 90%.

Figure 3:
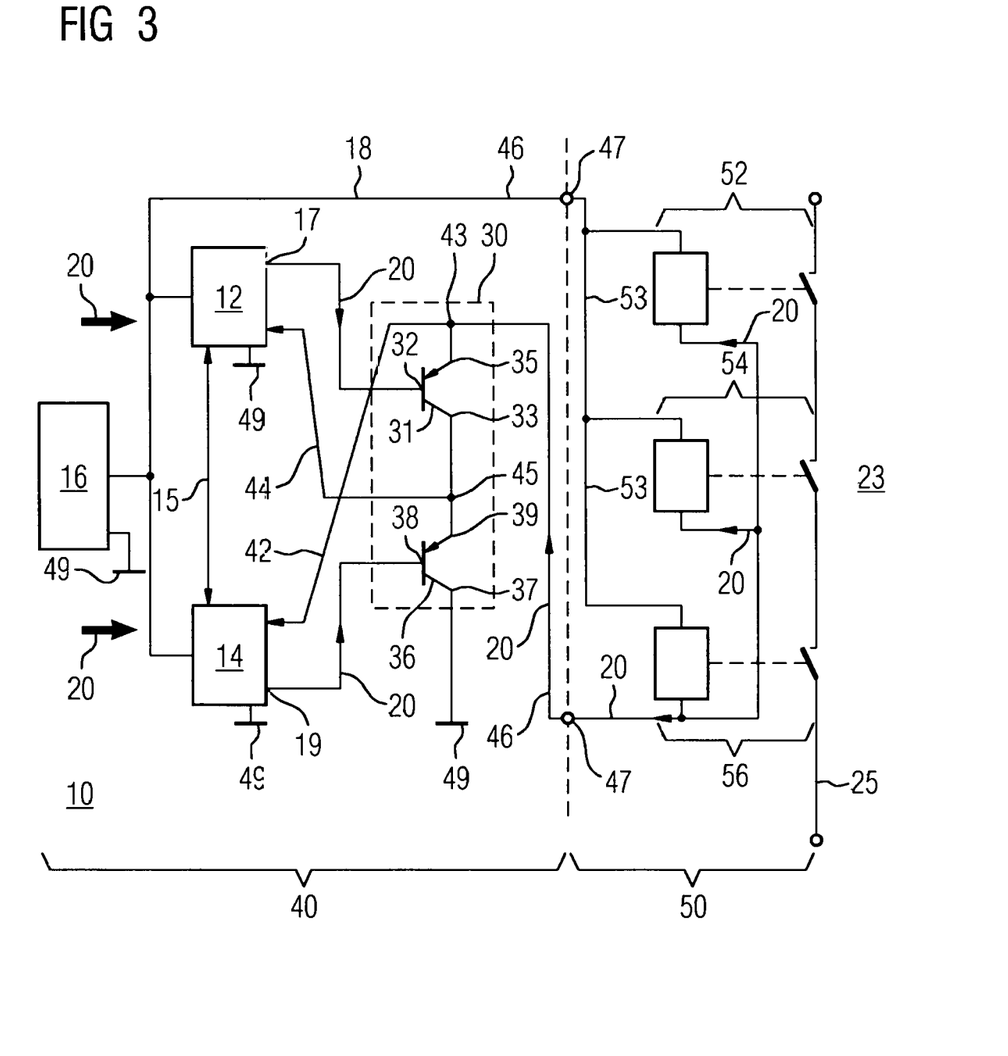
FIG. 3 schematically shows the structure of a third exemplary embodiment of the safety switching device.

FIG. 3 depicts a third exemplary embodiment of the safety switching device 10 according to one or more of the present embodiments, which is substantially divided into a control side 40 and an actuation side 50. A voltage supply 16 used for the power supply to the components on the control side 40 is arranged on the control side 40. The voltage supply 16 provides an operating voltage 18 for a first and second control unit 12, 14 and switching elements 52, 54, 56 on the actuation side 50. The control units 12, 14 and the power supply unit 16 are each connected to a frame terminal 49. A control line, not shown in further detail, is used to emit switch commands 20 to the first and a second control unit 12, 14, which converts them into a switching operation on the actuation side 50.

The switch commands 20 reach the control units 12, 14 via signal inputs, not shown in further detail. The monitoring unit 30 comprises a first and a second connection element 31, 36, which are embodied as transistors and connected in series. A first collector terminal 33 of the first connection element 31 is coupled to a second emitter terminal 39 of the second connection element 36. In-between there is a second branch 45, from which the second feedback channel 44 branches to the first control unit 12. A first base terminal 32 of the first connection unit 31 is connected to an output 17 of the first control unit 12. The switch command 20 is emitted by the first control unit 12 as an actuation of the first base terminal 32 in the first connection element 31. In the case of a corresponding actuation at the first base terminal 32, the first connection element 31 permits current flow from a coupling point 47 to the first emitter terminal 35 and the first collection terminal 33. Furthermore, in the region of the first emitter terminal 35, there is a first branch 43 from which a first feedback channel 42 branches. The first feedback channel 42 in turn leads to the second control unit 14. The switching state of the first connection element 31 is reported to the second control unit 14 via the first feedback channel 42. The second control unit 14 is embodied to compare the input of the feedback channel with the switch command 20 present at the second control unit 14 and hence to verify an intended switching state at the first connection element 31 or to identify a faulty switching state.

Similarly to the first control unit 12, the switch command 20 is emitted by the second control unit 14 via its output 19 to the second base terminal 38 of the second connection element 36. The corresponding actuation of the second base terminal 38 causes the second connection element 36 to permit current flow via a second emitter terminal 39 to a second collector terminal 37. The current flow from the coupling point 47 via the second emitter terminal 39 to the frame terminal 49 takes place via a signal output 46. A present current flow in the signal output 46 depicts the present switch command 20 to the actuation side 50. A second branch 45 from which a second feedback channel 44 leads to the first control unit 12 is arranged between the coupling point 47 and the second emitter terminal 39. The signal guided via the second feedback channel 44 to the first control unit 12 represents the switching state of the second connection element 36. The first control unit 12 is embodied to compare the signal transported via the second feedback channel 44 signal with the present switch command 20. This enables the first control unit 12 to verify an intended switching state at the second connection element 36 or to identify a faulty switching state.

If the first control unit 12 recognizes a faulty switching state at the second connection element 36, the first control unit 12 is embodied, by means of a corresponding actuation at the first base terminal 32 of the first connection unit 31, to prevent current flow to the first emitter terminal 35. This prevents further operation based on a faulty switch command 20 or hardware defect in the safety switching device 10. The second control unit 14 is similarly embodied, on recognition of a faulty switching state at the first connection element 31, by actuation of the second base terminal 38, to prevent current flow to the second collector terminal 37.

Thus, in the safety switching device according to one or more of the present embodiments, at least one single-failure tolerance, also called hardware failure tolerance of one, is implemented on the control side 40. The connection elements 31, 36 of the monitoring unit establish indirect crossover monitoring between the control units 12, 14. Furthermore, the first and second control unit 12, 14 are directly connected to one another via a diagnostic line 15. The diagnostic line also comprises an actuation line that facilitates mutual cut-off of the control units. This implements direct mutual monitoring so that combination with indirect crossover monitoring achieves a particularly high degree of safety on the control side 40. In particular, in the case of the presence of one hardware failure, a diagnostic coverage of 90% to 99% is achieved on the control side 40.

The connection between the control side 40 and the actuation side 50 takes place via the coupling point 47. A first, a second and a third switching element 52, 54, 56 embodied as standard relays are arranged on the actuation side 50. The switching elements 52, 54, 56 are each embodied to interrupt a line 25 of a load circuit 23, not shown in further detail. The switching elements 52, 54, 56 are connected to a common signal line 53 via which the switch command 20 is emitted to the switching elements 52, 54, 56 in the case of corresponding actuation and functionality of components on the control side 40. The switching elements 52, 54, 56 are each connected to the control side 40 via the coupling point 47 to which the operating voltage 18 is applied with a common signal line 53. Furthermore, the switching elements 52, 54, 56 are also connected to the control side 40 via the further coupling point 47 that leads to the monitoring unit 30. This causes an mm circuit to be implemented in each of the switching elements 52, 54, 56. The parallel connection of the switching elements 52, 54, 56 ensures safe separation of the line 25 of the load circuit 23 even with the presence of two hardware failures on the actuation side 50. Overall, the actuation side 50 has at least one two-failure tolerance, also called hardware failure tolerance of two. At least two of the switching elements 52, 54, 56 are diverse, i.e. have different designs, so that the failure tolerance of the actuation side 50 is further increased. When two hardware failures are present, the actuation side 50 achieves a safe failure fraction SFF of 60%, in particular 70% to 90%.

Figure 4:
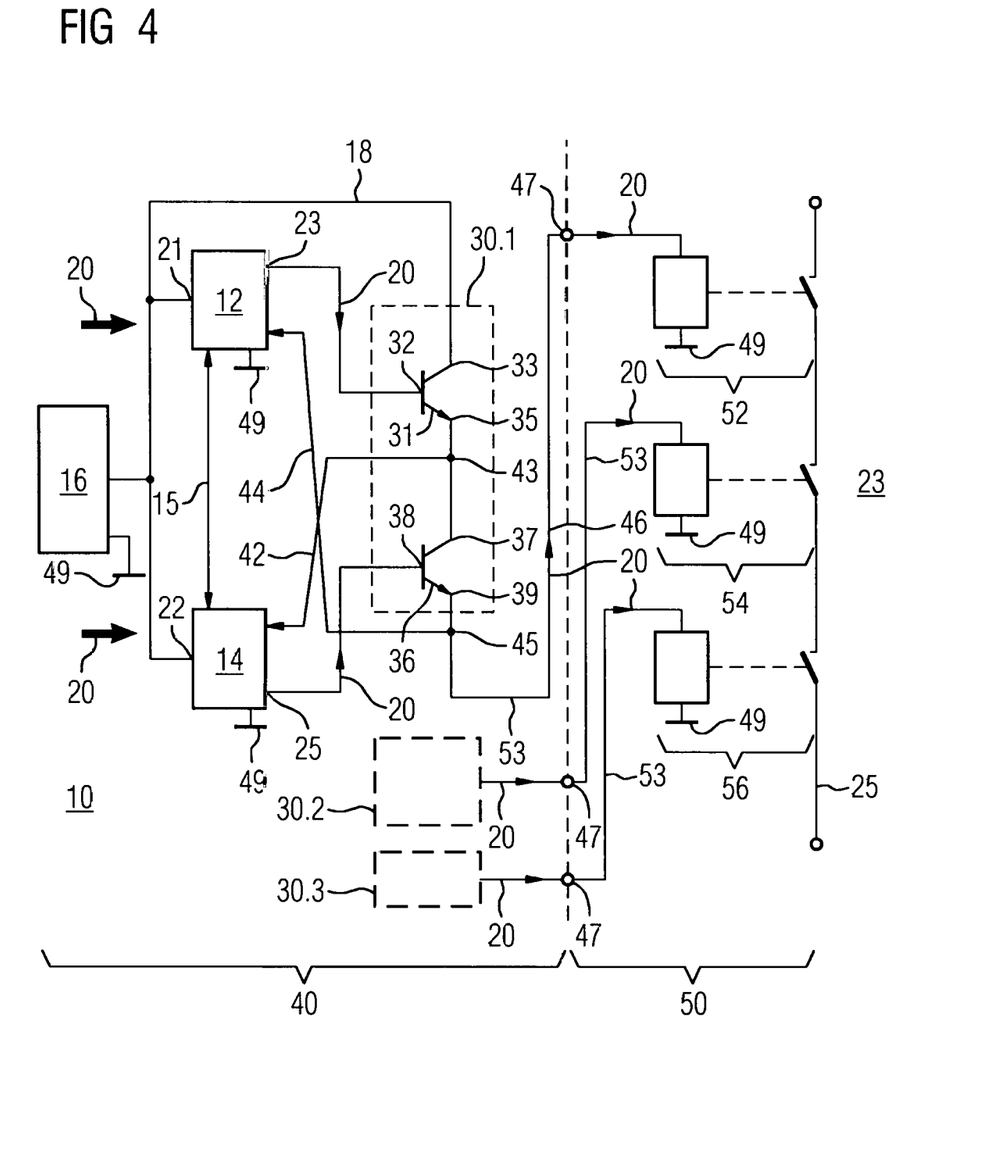
FIG. 4 schematically shows the structure of a fourth exemplary embodiment of the safety switching device.

FIG. 4 depicts a first exemplary embodiment of the safety switching device 10 according to one or more of the present embodiments, which is substantially divided into a control side 40 and an actuation side 50. A voltage supply 16 used for the power supply to the components on the control side 40 is arranged on the control side 40. The voltage supply 16 provides an operating voltage 18 for a first and second control unit 12, 14 and a first monitoring unit 30.1. The control units 12, 14 and the power supply unit 16 are each connected to a frame terminal 49. A control line, not shown in further detail, is used to emit switch commands 20 to the first and a second control unit 12, 14, which converts them into a switching operation on the actuation side 50. The switch commands 20 reach the control units 12, 14 via their signal inputs, not shown in further detail. The first monitoring unit 30.1 comprises a first and a second connection element 31, 36, which are embodied as transistors and connected in series. The operating voltage 18 is applied to a first collector terminal 33. A first base terminal 32 of the first connection unit 31 is connected to an output 17 of the first control unit 12. The switch command 20 is emitted by the first control unit 12 as an actuation of the first base terminal 32 in the first connection element 31. In the case of a corresponding actuation at the first base terminal 32, the first connection element 31 permits current flow through a first emitter terminal 35. Furthermore, the second collector terminal 37 of the second connection element 36 lies within the region of the first emitter terminal 35, and in-between there is a first branch 43 from which a first feedback channel 42 branches. The first feedback channel 42 in turn leads to the second control unit 14. The switching state of the first connection element 31 is reported to the second control unit 14 via the first feedback channel 42. The second control unit 14 is embodied to compare the input of the feedback channel with the switch command 20 present at the second control unit 14 and hence to verify an intended switching state at the first connection element 31 or to identify a faulty switching state. The control side 40 also comprises a second and third monitoring unit 30.2, 30.3, which are each assigned to a second or third switching element 54, 56 on the actuation side. The second and third monitoring unit 30.2, 30.3 are each embodied similarly to the first monitoring unit 30.1 and connected in the same way to the first and second control unit 12, 14. The exemplary embodiment in FIG. 4 implements the principle of a parallel structure of die control side 40. When only two control units 12, 14 are used, a separate protection of the output of the switch command 20 for each individual switching element 52, 54, 56 is implemented by the separate monitoring units 30.1, 30.2, 30.3.

Similarly to the first control unit 12, the switch command 20 is emitted by the second control unit 14 via its output 19 to the second base terminal 38 of the second connection element 36. The corresponding actuation of the second base terminal 38 causes the second connection element 36 to permit current flow via a second emitter terminal 39. The current flow from the second emitter terminal 39 to the coupling point 47 takes place via a signal output 46. A present current flow in the signal output 46 depicts the present switch command 20 to the actuation side 50. A second branch 45 from which a second feedback channel 44 leads to the first control unit 12 is arranged between the coupling point 47 and the second emitter terminal 39. The signal guided via the second feedback channel 44 to the first control unit 12 represents the switching state of the second connection element 36. The first control unit 12 is embodied to compare the signal transported via the second feedback channel 44 with the present switch command 20. Thus, the first control unit 12 is embodied to verify an intended switching state at the second connection element 36 or to identify a faulty switching state.

If the first control unit 12 recognizes a faulty switching state at the second connection element 36, the first control unit 12 is embodied, by means of a corresponding actuation at the first base terminal 32 of the first connection unit 31, to prevent current flow to the first emitter terminal 35. This prevents further operation based on a faulty switch command 20 or a hardware defect in the safety switching device 10. The second control unit 14 is similarly embodied, on recognition of a faulty switching state at the first connection element 31, by actuation of the second base terminal 38, to prevent current flow to the second emitter terminal 39.

Hence, in the safety switching device according to one or more of the present embodiments. at least one single failure tolerance, also called hardware tolerance of one, is implemented on the control side 40. The connection elements 31, 36 of the monitoring unit establish indirect crossover monitoring between the control units 12, 14. Furthermore, the first and second control unit 12, 14 are directly connected to one another via a diagnostic line 15. The diagnostic line also comprises an actuation line that facilitates mutual cut-off of the control units. This implements direct mutual monitoring so that combination with indirect crossover monitoring achieves a particularly high degree of safety on the control side 40. In particular, in the case of the presence of one hardware failure, diagnostic coverage of 90% to 99% is achieved on the control side.

The connection between the control side 40 and the actuation side 50 takes place via the coupling point 47. A first, a second and a third switching element 52, 54, 56 embodied as standard relays are arranged on the actuation side 50. The switching elements 52, 54, 56 are each embodied to interrupt a line 25 of a load circuit 23, not shown in further detail. The first switching element 52 is connected via the coupling point 47 to the first monitoring unit 30.1 via which the switch command 20 is emitted to the switching element 52 in the case of corresponding actuation and functionality of the components on the control side 40. The second and third switching element 54, 56 are each coupled to the second monitoring unit 30.2 or the third monitoring unit 30.3 via their own coupling points. This achieves a high degree of operational safety for each switching element 52, 54, 56. Each of the switching elements 52, 54, 56 has a separate frame terminal 49 and hence each of the switching elements is pp switched. The parallel connection of the switching elements 52, 54, 56 ensures a safe separation of the line 25 of the load circuit 23 even when two hardware failures are present on the actuation side 50. Overall, the actuation side 50 has at least one two-failure tolerance, also called hardware failure tolerance of two. At least two of the switching elements 52, 54, 56 are diverse, i.e. have different designs so that the failure tolerance of the actuation side 50 is further increased. When two hardware failures are present, the actuation side 50 achieves a safe failure fraction SFF of 60%, in particular 70% to 90%.

Figure 5:
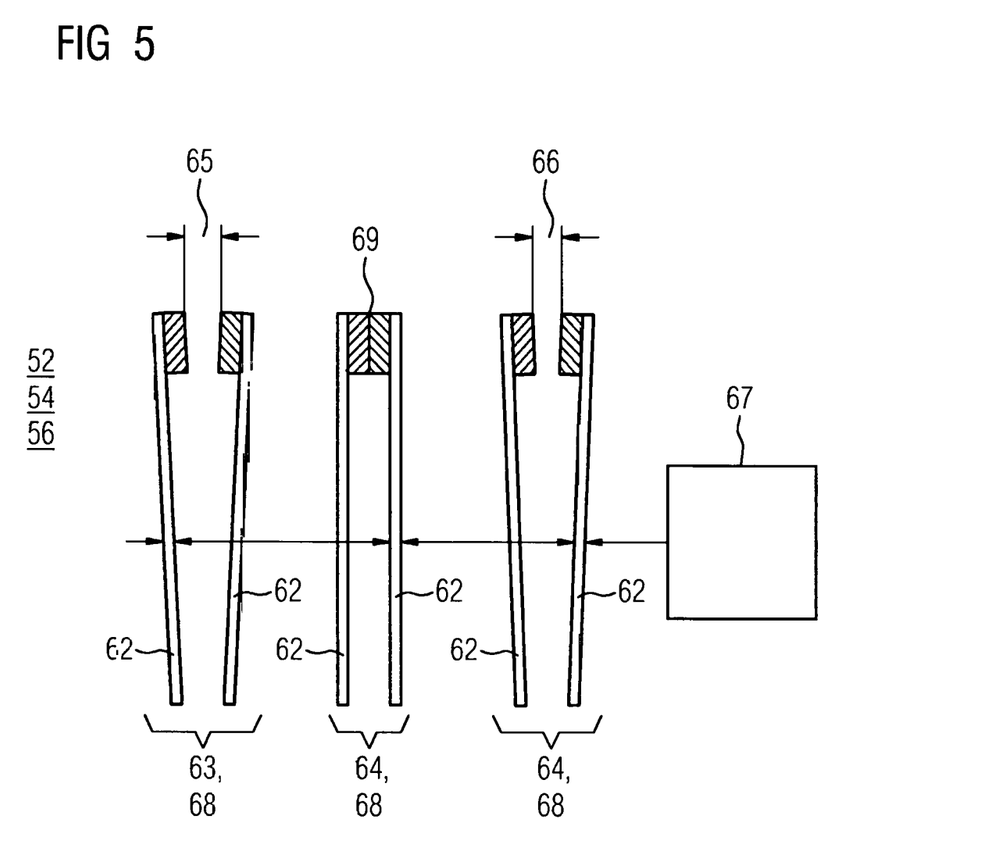
FIG. 5 schematically shows the contacts of a switching element embodied as a standard component.

FIG. 5 schematically depicts the contacts 62 of a switching element 52, 54, 56 embodied as a standard component. The contacts 62 belong as contact spring pairs 68 to a normally closed contact 63 and two normally open contacts 64. The present switching state can be set by a drive 67. In the switching state in FIG. 5, there is contact sticking, i.e. welding 69, at the normally open contact 64. On the actuation of the drive 67, the contact spring pair 68 with the welding 69 cannot be separated like the adjacent normally open contact 64. The contacts 62 of an open normally closed contact 63 have a safe contact spacing 65 so that it is also impossible for arcing to form with the present operating voltages. Such contact spacings are at least 0.5 mm. In the case of the intact normally open contact 64, i.e. the normally open contact 64 without welding 69, on the other hand, the absence of forced guidance of the contacts 62 means that actuation by means of the drive 67 results in a non-safe contact spacing 66. Arcing can cause a current flow to enter an unsafe contact spacing 66 of this kind. Herein, an unsafe contact spacing is up to 0.5 mm. Hence, the normally open contact 64 without welding then takes on an uncertain switching state.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that be foregoing description be regarded as illustrative rather than limiting, and that it be understood that all equivalents and/or combinations of embodiments are intended to be included in this description.

The invention claimed is:

1. A safety switching device comprising:
    a control side with at least one single-failure tolerance;
    a first control unit and a second control unit, each of the first control unit and the second control unit being configured for emitting a switch command and each comprising at least one monitoring unit having a first connection element and a second connection element,
    wherein the first control unit is configured to emit the switch command to the first connection element and the second control unit is configured to emit the switch command to the second connection element,
    wherein the first connection element and the second connection element are configured to emit the switch command to at least one switching element of at least two switching elements on an actuation side,
    wherein the at least two switching elements are configured to interrupt a line of a load circuit,
    wherein the at least one switching element of the at least two switching elements is connected in series with the first connection element and the second connection element,
    wherein the at least two switching elements are each configured as standard components that are free from a forced guidance of contacts of the at least two switching elements, and
    wherein the first connection element is directly connected to the second control unit via a first feedback channel, and the second connection element is directly connected to the first control unit via a second feedback channel.

2. The safety switching device of claim 1, wherein the first connection element, the second connection element, or the first connection element and the second connection element comprise a collector terminal, a base terminal, and an emitter terminal.

3. The safety switching device of claim 2, wherein the emitter terminal of the first connection element is directly connected to the collector terminal of the second connection element, or the collector terminal of the first connection unit is directly connected to the emitter terminal of the second connection element.

4. The safety switching device of claim 1, wherein the first control unit is directly connected to a base terminal of the first connection element, the second control unit is directly connected to a base terminal of the second connection element, or the first control unit is directly connected to the base terminal of the first connection element and the second control unit is directly connected to the base terminal of the second connection element.

5. The safety switching device claim 1, wherein the actuation side comprises at least one two-failure tolerance, has a safe failure fraction of at least 60%, or comprises at least one two-failure tolerance and has a safe failure fraction of at least 60%.

6. The safety switching device of claim 1, wherein the first connection element, the second connection element, or the first connection element and the second connection element are in each case configured as a transistor, a field-effect transistor, a thyristor, a TRIAL, an IGBT, a driver module, an integrated circuit, or an AND module.

7. The safety switching device of claim 1, wherein the control side of the safety switching device comprises the first control unit, the second control unit, or the first control unit and the second control unit, the monitoring unit, or a combination thereof and is configured as an ASIC.

8. The safety switching device of claim 1, wherein a first switching element of the at least two switching elements is actuatable by a first monitoring unit, and a second switching element of the at least two switching elements is actuatable by a second monitoring unit.

9. The safety switching device of claim 1, wherein the at least two switching elements are actuatable via a common signal line.

10. The safety switching device of claim 1, wherein the at least two switching elements are in each case configured as a relay, an auxiliary contactor, a main contactor, or as a magnet valve.

11. The safety switching device of claim 1, wherein the at least two switching elements are configured as diverse.

12. The safety switching device of claim 1, wherein the first control unit and the second control unit are connected to one another for mutual diagnosis.

13. A safety-related device configured as a safety switching device, as a safe coupling relay, safe relay module, as safe PLC relay output as a safety module in a PLC, the safety-related device comprising:
   a safety switching device comprising:
      a control side with at least one single-failure tolerance:
      a first control unit and a second control unit, each of the first control unit and the second control unit being configured on an actuation side for emitting a switch command to at least two switching elements; and
      a monitoring unit having a first connection element and a second connection element, the monitoring unit being configured to emit the switch command to at least one switching element of a load circuit,
   wherein the at least two switching elements are each configured as standard components that are free from a forced guidance of contacts of the at least two switching elements, and
   wherein the first connection element is directly connected to the second control unit via a first feedback channel, and the second connection element is directly connected to the first control unit via a second feedback channel.

14. The safety switching device claim 5, wherein the actuation side has a safe failure fraction of 70% to 90%.

* * * * *